United States Patent
Oku et al.

(10) Patent No.: US 11,391,097 B2
(45) Date of Patent: Jul. 19, 2022

(54) THREADED CONNECTION FOR STEEL PIPE

(71) Applicants: NIPPON STEEL CORPORATION, Tokyo (JP); VALLOUREC OIL AND GAS FRANCE, Aulnoye-Aymeries (FR)

(72) Inventors: Yousuke Oku, Tokyo (JP); Sadao Douchi, Tokyo (JP)

(73) Assignees: NIPPON STEEL CORPORATION, Tokyo (JP); VALLOUREC OIL AND GAS FRANCE, Aulnoye-Aymeries (FR)

( * ) Notice: Subject to any disclaimer, the term of this patent is extended or adjusted under 35 U.S.C. 154(b) by 0 days.

(21) Appl. No.: 16/973,619

(22) PCT Filed: Jul. 24, 2019

(86) PCT No.: PCT/JP2019/028958
§ 371 (c)(1),
(2) Date: Dec. 9, 2020

(87) PCT Pub. No.: WO2020/075365
PCT Pub. Date: Apr. 16, 2020

(65) Prior Publication Data
US 2021/0246737 A1  Aug. 12, 2021

(30) Foreign Application Priority Data
Oct. 11, 2018 (JP) ............................. JP2018-192229

(51) Int. Cl.
*F16L 15/06* (2006.01)
*E21B 17/042* (2006.01)

(52) U.S. Cl.
CPC ............. *E21B 17/042* (2013.01); *F16L 15/06* (2013.01)

(58) Field of Classification Search
CPC ................................ F16L 15/06; E21B 17/042
See application file for complete search history.

(56) References Cited

U.S. PATENT DOCUMENTS 3,989,284 A * 11/1976 Blose .................... E21B 17/042
285/332.2
RE30,647 E    6/1981 Blose
(Continued)

FOREIGN PATENT DOCUMENTS

| JP | 2012512347 A | 5/2012 |
| JP | 2015534614 A | 12/2015 |
| WO | 2015194193 A1 | 12/2015 |

*Primary Examiner* — David Bochna
(74) *Attorney, Agent, or Firm* — Greer Burns & Crain Ltd.

(57) ABSTRACT

A threaded connection for steel pipe that provides both high torque performance and high tension performance is provided. A threaded connection 1 includes a tubular pin 10 formed by one tip portion of a steel pipe and a tubular box 20 adapted to be made up on the pin 10 as the pin 10 is inserted into the box. The pin 10 includes a male thread 11 provided on an outer periphery of the pin 10, the male thread being a wedge thread. The box 20 includes a female thread 21 corresponding to the male thread 11 and provided on the inner periphery of the box 20, the female thread being a wedge thread. The threaded connection 1 satisfies the following expression, (1):

$$3\% \leq (LP-SP)/LP \leq 8\% \qquad (1).$$

In expression (1), LP is the pitch between loading flanks 111 of the male thread 11, and SP is the pitch between stabbing flanks 112 of the male thread 11.

4 Claims, 6 Drawing Sheets

(56) References Cited

U.S. PATENT DOCUMENTS

| | | | |
|---|---|---|---|
| 4,822,081 A * | 4/1989 | Blose | E21B 17/0423 |
| | | | 285/334 |
| 6,158,785 A | 12/2000 | Beaulier et al. | |
| 9,822,591 B2 * | 11/2017 | Granger | E21B 17/0423 |
| 2011/0278838 A1 * | 11/2011 | Martin | E21B 17/042 |
| | | | 285/333 |
| 2014/0084582 A1 | 3/2014 | Elder et al. | |
| 2014/0203556 A1 * | 7/2014 | Besse | E21B 17/042 |
| | | | 285/390 |
| 2016/0161031 A1 * | 6/2016 | Martin | F16L 15/06 |
| | | | 285/390 |
| 2017/0108151 A1 * | 4/2017 | Oku | E21B 17/042 |
| 2019/0330930 A1 * | 10/2019 | Oku | E21B 17/042 |
| 2020/0325734 A1 * | 10/2020 | Langford | E21B 17/042 |
| 2021/0341085 A1 * | 11/2021 | Oku | F16L 15/06 |

* cited by examiner

THREADED CONNECTION FOR STEEL PIPE

This is a National Phase Application filed under 35 U.S.C. § 371, of International Application No. PCT/JP2019/028958, filed Jul. 24, 2019, the contents of which are incorporated by reference.

BACKGROUND

Technical Field

The present disclosure relates to a threaded connection for steel pipe.

Description of the Background Art

Steel pipes called oil-well pipes are used, for example, for prospecting or producing oil or natural gas in oil wells or natural-gas wells (hereinafter collectively referred to as "oil wells" or the like), developing non-conventional resources such as oil sand or shale gas, retrieving or storing carbon dioxide (Carbon dioxide Capture and Storage (CCS)), geothermal power generation, or in hot springs. A threaded connection is used to connect steel pipes.

Such threaded connections for steel pipes are generally categorized as coupling type and integral type. A coupling-type connection connects a pair of pipes, one of which is a steel pipe and the other one is a coupling. In this case, a male thread is provided on the outer periphery of each of the ends of the steel pipe, while a female thread is provided on the inner periphery of each of the ends of the coupling. Then, a male thread of the steel pipe is screwed into a female thread of the coupling such that they are made up and connected. An integral-type connection connects a pair of pipes that are both steel pipes, and does not use a separate coupling. In this case, a male thread is provided on the outer periphery of one end of each steel pipe, while a female thread is provided on the inner periphery of the other end. Then, the male thread of one steel pipe is screwed into the female thread of the other steel pipe such that they are made up and connected.

A connection portion of a pipe end on which a male thread is provided includes an element to be inserted into a female thread, and thus is usually referred to as "pin". A connection portion of a pipe end on which a female thread is provided includes an element for receiving a male thread, and thus is referred to as "box". A pin and a box constitute ends of pipes and are thus tubular in shape.

When threaded connections are used at shallow levels in very deep oil wells, for example, large tensile loads derived from oil-well pipes' own weights are applied to threaded connections, while large compression loads due to thermal expansion are applied to threaded connections at deep levels.

U.S. Reissue Pat. No. 30647 (Patent Document 1), U.S. Pat. No. 6,158,785 (Patent Document 2) and WO 2015/194193 (Patent Document 3) each disclose a threaded connection using wedge threads. A wedge thread has a thread width that gradually changes as it goes along its helical direction. A wedge thread is also known as dovetailed thread, and provides high torque performance. However, none of Patent Documents 1 to 3 specifies at what rate the thread width of their wedge threads changes.

JP 2012-512347 A (Patent Document 4) also discloses a threaded connection using wedge threads. In areas near the ends of the male-thread region, both the lead as measured between male stabbing flanks and the lead as measured between male loading flanks are constant. Similarly, in areas near the ends of the female-thread region, both the lead as measured between female stabbing flanks and the lead as measured between female loading flanks are constant. Consequently, thread width is constant near the ends of the threaded regions. Although it can be recognized that there is a difference between the lead as measured between loading flanks and the lead as measured between stabbing flanks, the document specifies no specific value for this difference.

The following prior art documents are incorporated herein by reference.

[Patent Document 1] U.S. Reissue Pat. No. 30647
[Patent Document 2] U.S. Pat. No. 6,158,785
[Patent Document 3] WO 2015/194193
[Patent Document 4] JP 2012-512347 A

SUMMARY

Since the loading flank and stabbing flank of a wedge thread have negative flank angles, wedge threads exhibit high torque performance as they interlock during make-up. Further, to facilitate make-up, a wedge thread may have a thread-crest width that decreases as it goes toward the tip of the pin or box. In other words, there is a difference between the loading-flank pitch and stabbing-flank pitch. This difference in pitch may be referred to as "delta lead". The delta lead determines the thread-crest widths as measured near the tips of the pin and box.

Instead of delta lead, wedge ratio may be used to take the effect of the absolute value of the thread pitch into consideration. The wedge ratio is determined by dividing the delta lead by the loading-flank pitch and is the ratio of the delta lead to the loading-flank pitch, expressed as a percentage.

If the wedge ratio is high, this means that the rate at which the thread-crest width decreases is also high. If the wedge ratio is high, the thread-crest width decreases near the tip of the pin or box. If the thread-crest width is small, the wedge thread may not be able to resist a large tensile load, and the thread crest itself may be broken. Care is thus needed in deciding the wedge ratio. The ability of a wedge thread to resist a tensile load will be hereinafter referred to as "tension performance".

Patent Document 4 (JP 2012-512347 A), listed above, discloses optimizing wedge ratio. However, there is no document that evaluates the effect of the wedge ratio on torque performance as well as tension performance.

An object of the present disclosure is to provide a threaded connection for steel pipe that provides both high torque performance and high tension performance.

The present inventors did extensive research to find an appropriate wedge ratio that improves both torque performance and tension performance. They found out that both high torque performance and high tension performance will be achieved by changing the wedge ratio.

A threaded connection for a steel pipe according to the present disclosure includes a tubular pin and a tubular box. The tubular pin is formed by one tip portion of the steel pipe. The tubular box is made up on the pin as the pin is inserted into the box. The pin includes a male thread. The male thread is provided on an outer periphery of the pin, and is a wedge thread. The box includes a female thread. The female thread corresponds to the male thread and is provided on an inner periphery of the box, and is a wedge thread. The threaded connection satisfies the following expression, (1):

$$3\% \leq (LP-SP)/LP \leq 8\% \qquad (1).$$

In expression (1), LP is the pitch between loading flanks of the male thread. SP is the pitch between stabbing flanks of the male thread.

DETAILED DESCRIPTION OF THE PREFERRED EMBODIMENTS

A threaded connection for a steel pipe according to the present embodiment includes a tubular pin and a tubular box. The tubular pin is formed by one tip portion of the steel pipe. The tubular box is made up on the pin as the pin is inserted into the box. The pin includes a male thread. The male thread is provided on an outer periphery of the pin, the male thread being a wedge thread. The box includes a female thread. The female thread corresponds to the male thread and provided on an inner periphery of the box, the female thread being a wedge thread. The threaded connection satisfies the following expression, (1):

$$3\% \leq (LP-SP)/LP \leq 8\% \quad (1).$$

In expression (1), LP is the pitch between loading flanks of the male thread. SP is the pitch between stabbing flanks of the male thread.

Preferably, the threaded connection satisfies the following expression, (2).

$$4\% \leq (LP-SP)/LP \leq 7\% \quad (2).$$

The threaded connection may satisfy the following expression, (3).

$$-10 \text{ degrees} \leq \alpha \leq -1 \text{ degree} \quad (3).$$

In expression (3), α is the flank angle of the loading and stabbing flanks of the male thread.

The male thread and the female thread may each include a perfect-thread portion including a perfect thread. The perfect-thread portion may have a length of 40 to 60 mm as measured in an axial direction of the steel pipe.

The threaded connection for steel pipe according to the present embodiment will now be described with reference to the drawings. The same and corresponding components are labeled with the same characters in the drawings, and the same description will not be repeated.

Figure 1:
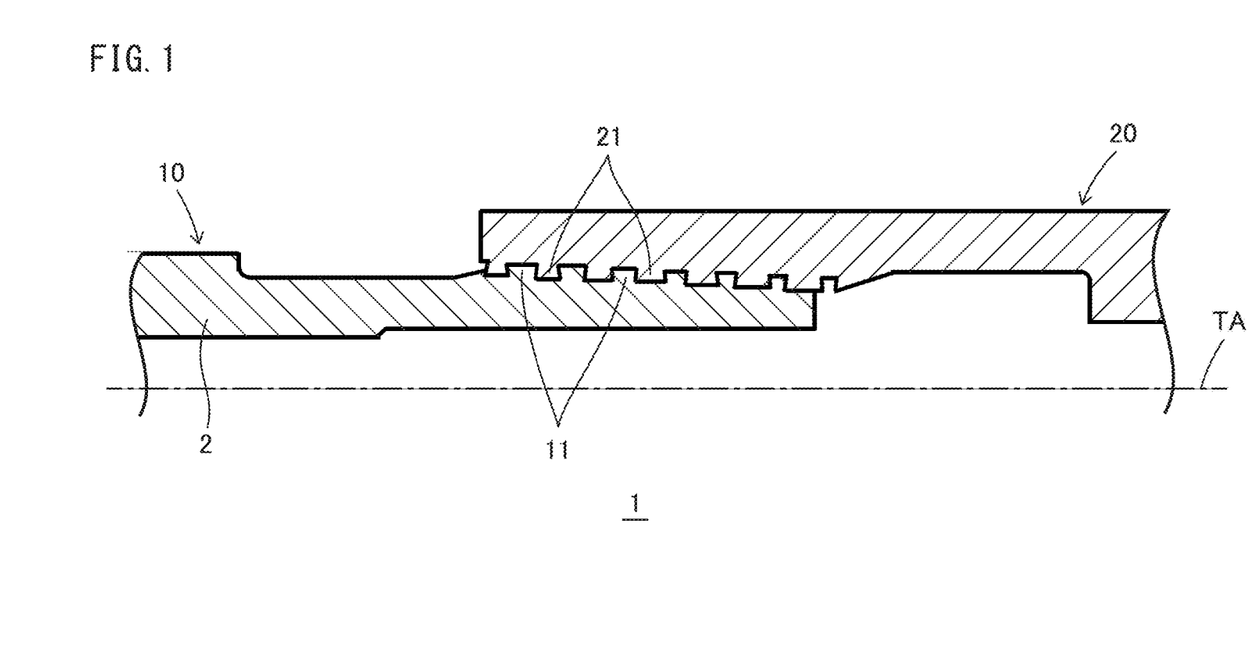
FIG. 1 is a longitudinal cross-sectional view of a threaded connection for steel pipe according to an embodiment, taken along the pipe-axis direction.

Referring to FIG. 1, a threaded connection for steel pipe according to the present embodiment, denoted by 1, includes a tubular pin 10 and a tubular box 20. The pin 10 is formed by one tip portion of a steel pipe 2. The box 20 is made up on the pin 10 as the pin 10 is inserted into the box. The portions of the steel pipe 2 other than the tip portion may be hereinafter specifically referred to as "steel-pipe body".

The pin 10 includes a male thread 11. The male thread 11 is provided on the outer periphery of the pin 10. The box 20 includes a female thread 21. The female thread 21 corresponds to the male thread 11 and provided on the inner periphery of the box 20. More specifically, the male thread 11 is helically formed on the outer periphery of the pin 10. The female thread 21 is helically formed on the inner periphery of the box 20. Each of the male and female threads 11 and 21 is constituted by a tapered thread. Each of the male and female threads 11 and 12 is constituted by a wedge thread.

Figure 2:
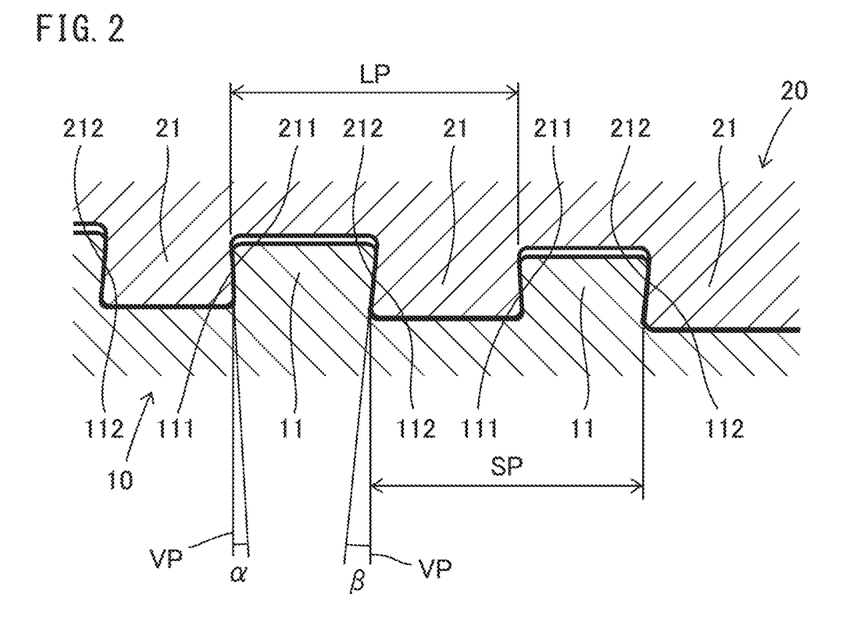
FIG. 2 is an enlarged longitudinal cross-sectional view of the male and female threads of FIG. 1.

Referring to FIG. 2, the male thread 11 has a loading flank 111 and the female thread 21 has a loading flank 211, both having a flank angle α. The male thread 11 has a stabbing flank 112 and the female thread 21 has a stabbing flank 212, both having a flank angle β. The flank angle α is the angle of the loading flanks 111 and 211 relative to a plane VP perpendicular to the pipe axis (i.e. axis of the steel pipe 2) TA. The flank angle β is the angle of the stabbing flanks 112 and 212 relative to a plane VP perpendicular to the pipe axis TA. If the loading flanks 111 and 211 or the stabbing flanks 112 and 212 are parallel to a plane VP, their flank angle is zero degrees. If the loading flank 111 of the male thread 11 is inclined toward the tip of the pin 10 relative to the plane VP (in other words, if the loading flank 211 of the female thread 21 is inclined toward the tip of the box 20 relative to the plane VP), the flank angle α of the loading flanks 111 and 211 is positive. On the contrary, if the loading flank 111 of the male thread 11 is inclined toward the steel-pipe body of the pin 10 relative to the plane VP (in other words, if the loading flank 211 of the female thread 21 is inclined toward the steel-pipe body of the box 20 relative to the plane VP), the flank angle α of the loading flanks 111 and 211 is negative. Further, if the stabbing flank 112 of the male thread 11 is inclined toward the steel-pipe body of the pin 10 relative to the plane VP (in other words, if the stabbing flank 212 of the female thread 21 is inclined toward the pipe body of the box 20 relative to the plane VP), the flank angle of the stabbing flanks 112 and 212 is positive. On the contrary, if the stabbing flank 112 of the male thread 11 is inclined toward the tip of the pin 10 relative to the plane VP (in other words, if the stabbing flank 212 of the female thread 21 is inclined toward the tip of the box 20 relative to the plane VP), the flank angle of the stabbing flanks 112 and 212 is negative. The flank angles α and β of the wedge threads are both negative.

Although not limiting, it is preferable that the entire male and female threads 11 and 21 be constituted by perfect threads, with no imperfect thread present. If the entire threads 11 and 21 are constituted by perfect threads, this means an increased contact area between the male and female threads 11 and 21, which improves torque performance. Each of the perfect-thread portions (i.e. male and female threads 11 and 21 each constituted by a perfect thread) has a length of 40 to 60 mm, for example.

The threaded connection 1 for steel pipe satisfies the following expression, (1).

$$3\% \leq (LP-SP)/LP \leq 8\% \quad (1).$$

Preferably, the threaded connection 1 for steel pipe satisfies the following expression, (2).

$$4\% \leq (LP-SP)/LP \leq 7\% \quad (2).$$

In expressions (1) and (2), LP is the pitch between loading flanks 111 of the male thread 11 (hereinafter referred to as "loading-flank pitch"). SP is the pitch between stabbing flanks 112 of the male thread 11 (hereinafter referred to as "stabbing-flank pitch"). (LP–SP)/LP represents wedge ratio. The loading-flank pitch LP is equal to the pitch between loading flanks 211 of the female thread 21. The stabbing-flank pitch SP is equal to the pitch between stabbing flanks 212 of the female thread 21.

That is, the upper limit of the wedge ratio is 8%, and preferably 7%. The lower limit of the wedge ratio is 3%, and preferably 4%.

The threaded connection 1 for steel pipe satisfies the following expression, (3).

$$-10 \text{ degrees} \leq \alpha \leq -1 \text{ degree and } -10 \text{ degrees} \leq \beta \leq -1 \text{ degree} \quad (3).$$

In expression (3), $\alpha$ is the flank angle of the loading flank 111 of the male thread 11. $\beta$ is the flank angle of the stabbing flank 112 of the male thread 11. The flank angle $\alpha$ of the loading flank 111 of the male thread 11 may be equal to, or different from, the flank angle $\beta$ of the stabbing flank 112 of the male thread 11. The flank angle $\alpha$ of the stabbing flank 111 of the male thread 11 is substantially equal to the flank angle $\alpha$ of the loading flank 211 of the female thread 21. The flank angle $\beta$ of the stabbing flank 112 of the male thread 11 is substantially equal to the flank angle $\beta$ of the stabbing flank 212 of the female thread 21.

Exactly stating, the values of the loading-flank pitch LP, stabbing-flank pitch SP and flank angles $\alpha$ and $\beta$ are those before make-up.

In the present embodiment, the male and female threads 11 and 21 are constituted by wedge threads and their wedge ratio is in the range of 3 to 8%, thereby providing both high torque performance and high tension performance.

The threaded connection 1 may be coupling type or integral type. A coupling-type threaded connection includes two pins and a coupling. One of the pins is formed by a tip portion of one steel pipe. The other pin is formed by a tip portion of another steel pipe. The coupling includes two boxes. One of the boxes is formed by one end portion of the coupling. The other box is formed by the other end portion of the coupling. The one box is made up on the one pin as the one pin is inserted therein. The other box is located at the coupling end opposite to that with the one box, and is made up on the other pin as the other pin is inserted therein. On the other hand, an integral threaded connection is for connecting two steel pipes together, and includes a pin and a box. In the case of an integral threaded connection, one steel pipe includes a pin while the other steel pipe 2 includes a box.

Although an embodiment has been described, the present invention is not limited to the above-illustrated embodiment, and various modifications are possible without departing from the spirit of the invention.

EXAMPLES

To verify the effects of the present embodiment, torque performance and tension performance were evaluated using the finite element method (FEM). A wedge threaded connection was evaluated, and steel pipes described below were used.

Size: 9⅝ inches (with an outer diameter of the pipe body of 244.48 mm and an inner diameter of the pipe body of 216.8 mm)

Material: OCTG material L80 in accordance with the API standards (with a nominal proof stress of YS=552 MPa (80 ksi))

Thread taper: 1/12

Thread length: 50 mm (pin) and 60 mm (box)

Thread height: 1.8 mm

Flank angle: −5 degrees (for both loading flank and stabbing flank)

Loading-flank pitch: 7.2 mm, 8.64 mm or 10.8 mm

Wedge ratio: 2 to 10%

Stabbing-flank pitch: calculated backward based on wedge ratio

The threaded connection being evaluated was composed only by the male thread 11 and female thread 21, as shown in FIG. 1. The male and female threads 11 and 21 were entirely constituted by wedge threads and perfect threads.

Table 1 shows the dimensions etc. of the 27 threaded connections (i.e. samples) tested in the analysis.

TABLE 1

| No. | Size | Material | Thread tapering | Thread length [mm] | Thread height [mm] | Flank angle [deg] | Loading-flank pitch [mm] | Stabbing-flank pitch [mm] | Delta lead [mm] | Wedge ratio [%] | MTV [ft. lbs] | Equivalent plastic strain male thread loading flank | Equivalent plastic strain male thread stabbing flank | Equivalent plastic strain female thread loading flank | Equivalent plastic strain female thread stabbing flank |
|---|---|---|---|---|---|---|---|---|---|---|---|---|---|---|---|
| 1 | 9-5/8" | L80 | 1/12 | 50 | 1.8 | −5 | 8.64 | 8.467 | 0.173 | 2.00% | 39917 | 0.0158 | 0.0010 | 0.0256 | 0.0019 |
| 2 | | | | | | | | 8.381 | 0.259 | 3.00% | 53996 | 0.0176 | 0.0033 | 0.0280 | 0.0031 |
| 3 | | | | | | | | 8.294 | 0.346 | 4.00% | 55852 | 0.0208 | 0.0063 | 0.0299 | 0.0052 |
| 4 | | | | | | | | 8.208 | 0.432 | 5.00% | 56786 | 0.0217 | 0.0106 | 0.0344 | 0.0076 |
| 5 | | | | | | | | 8.122 | 0.518 | 6.00% | 58438 | 0.0287 | 0.0148 | 0.0411 | 0.0110 |
| 6 | | | | | | | | 8.035 | 0.605 | 7.00% | 61087 | 0.0290 | 0.0182 | 0.0494 | 0.0154 |
| 7 | | | | | | | | 7.949 | 0.691 | 8.00% | 61278 | 0.0378 | 0.0198 | 0.0585 | 0.0267 |
| 8 | | | | | | | | 7.862 | 0.778 | 9.00% | 61583 | 0.0644 | 0.0289 | 0.0745 | 0.0328 |
| 9 | | | | | | | | 7.776 | 0.864 | 10.00% | 61241 | 0.0640 | 0.0354 | 0.0904 | 0.0481 |
| 10 | | | | | | | 10.8 | 10.584 | 0.216 | 2.00% | 41701 | 0.0620 | 0.0013 | 0.0255 | 0.0025 |
| 11 | | | | | | | | 10.476 | 0.324 | 3.00% | 44348 | 0.0685 | 0.0019 | 0.0254 | 0.0025 |
| 12 | | | | | | | | 10.368 | 0.432 | 4.00% | 45675 | 0.0669 | 0.0026 | 0.0251 | 0.0025 |
| 13 | | | | | | | | 10.26 | 0.54 | 5.00% | 46710 | 0.0655 | 0.0035 | 0.0248 | 0.0026 |
| 14 | | | | | | | | 10.152 | 0.648 | 6.00% | 47185 | 0.0642 | 0.0049 | 0.0255 | 0.0027 |
| 15 | | | | | | | | 10.044 | 0.756 | 7.00% | 47577 | 0.0627 | 0.0060 | 0.0266 | 0.0027 |

TABLE 1-continued

|     |      |          |                    | Thread         | Thread         | Flank          | Loading-flank  | Stabbing-flank | Delta         | Wedge         |               | Equivalent plastic strain |                   |                 |                   |
|     |      |          |                    |                |                |                |                |                |               |               |               | male thread |           | female thread |           |
| No. | Size | Material | Thread tapering    | length [mm]    | height [mm]    | angle [deg]    | pitch [mm]     | pitch [mm]     | lead [mm]     | ratio [%]     | MTV [ft. lbs] | loading flank | stabbing flank | loading flank | stabbing flank |
|-----|------|----------|--------------------|----------------|----------------|----------------|----------------|----------------|---------------|---------------|---------------|---------------|----------------|---------------|----------------|
| 16  |      |          |                    |                |                |                |                | 9.936          | 0.864         | 8.00%         | 50531         | 0.0596        | 0.0087         | 0.0245        | 0.0089         |
| 17  |      |          |                    |                |                |                |                | 9.828          | 0.972         | 9.00%         | 51649         | 0.0571        | 0.0122         | 0.0318        | 0.0156         |
| 18  |      |          |                    |                |                |                |                | 9.72           | 1.08          | 10.00%        | 52568         | 0.0421        | 0.0193         | 0.0557        | 0.0290         |
| 19  |      |          |                    |                |                |                | 7.2            | 7.056          | 0.144         | 2.00%         | 58994         | 0.0305        | 0.0082         | 0.0134        | 0.0004         |
| 20  |      |          |                    |                |                |                |                | 6.984          | 0.216         | 3.00%         | 64600         | 0.0329        | 0.0108         | 0.0131        | 0.0038         |
| 21  |      |          |                    |                |                |                |                | 6.912          | 0.288         | 4.00%         | 67102         | 0.0368        | 0.0188         | 0.0146        | 0.0067         |
| 22  |      |          |                    |                |                |                |                | 6.84           | 0.36          | 5.00%         | 69646         | 0.0421        | 0.0207         | 0.0201        | 0.0097         |
| 23  |      |          |                    |                |                |                |                | 6.768          | 0.432         | 6.00%         | 71113         | 0.0489        | 0.0272         | 0.0335        | 0.0125         |
| 24  |      |          |                    |                |                |                |                | 6.696          | 0.504         | 7.00%         | 70977         | 0.0561        | 0.0308         | 0.0463        | 0.0206         |
| 25  |      |          |                    |                |                |                |                | 6.624          | 0.576         | 8.00%         | 72084         | 0.0648        | 0.0425         | 0.0593        | 0.0311         |
| 26  |      |          |                    |                |                |                |                | 6.552          | 0.648         | 9.00%         | 72010         | 0.0651        | 0.0471         | 0.1136        | 0.0460         |
| 27  |      |          |                    |                |                |                |                | 6.48           | 0.72          | 10.00%        | 70818         | 0.1378        | 0.0751         | 0.1381        | 0.0773         |

For the analysis, the threaded connection 1 shown in FIG. 1 was used as a base, to which changes in the dimensions of the male and female threads 11 and 21 were made, and torque performance and tension performance were evaluated.

Evaluation of Torque Performance

Yield torque was defined as the maximum torque value (MTV) at which make-up torque began to yield in the make-up torque chart, which was used to evaluate torque performance.

Evaluation of Tension Performance

A load substantially equal to the tensile load under which the threaded connection 1 yields was applied to a threaded connection that had been made up, and the maximum value of the equivalent plastic strain generated at the bases of the loading flanks 111 and 211 and stabbing flanks 112 and 212 of the thread located closest to the tip in each of the male and female threads 11 and 21 was used to evaluate tension performance. From experience in real-pipe tests, the present inventors know that the risk of a break of a thread crest becomes high if equivalent plastic strain is as high as about 0.08. In view of this, they assumed that the threshold of equivalent plastic strain was 0.08 and determined a sample to have good tension performance for an equivalent plastic strain lower than 0.08. Alternatively, to provide a greater margin on the safety side, the threshold of equivalent plastic strain may be 0.070.

Results of Analysis

Figure 3:
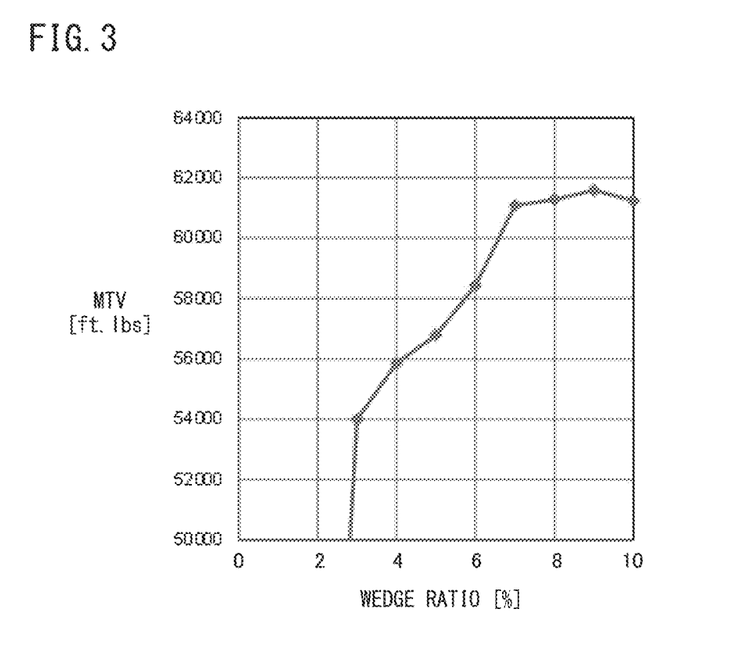
FIG. 3 is a graph illustrating the relationship between wedge ratio and yield torque for a loading-flank pitch of 8.64 mm.
Figure 4:
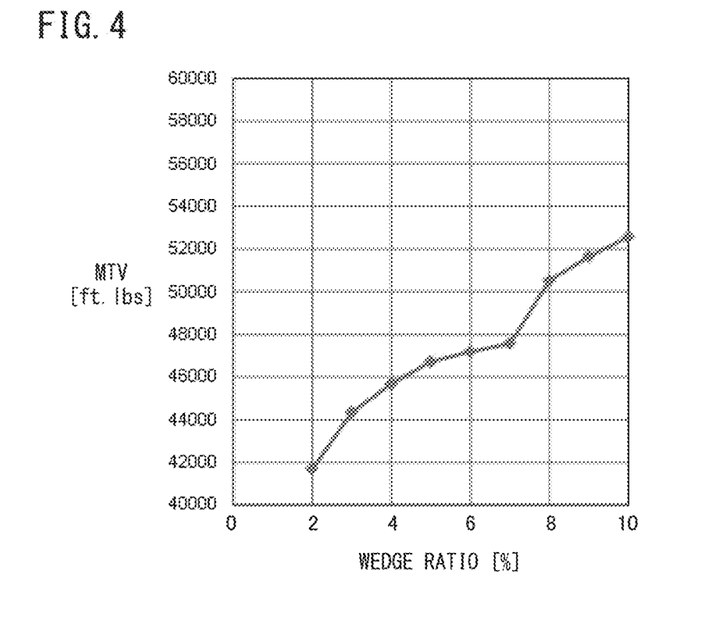
FIG. 4 is a graph illustrating the relationship between wedge ratio and yield torque for a loading-flank pitch of 10.8 mm.
Figure 5:
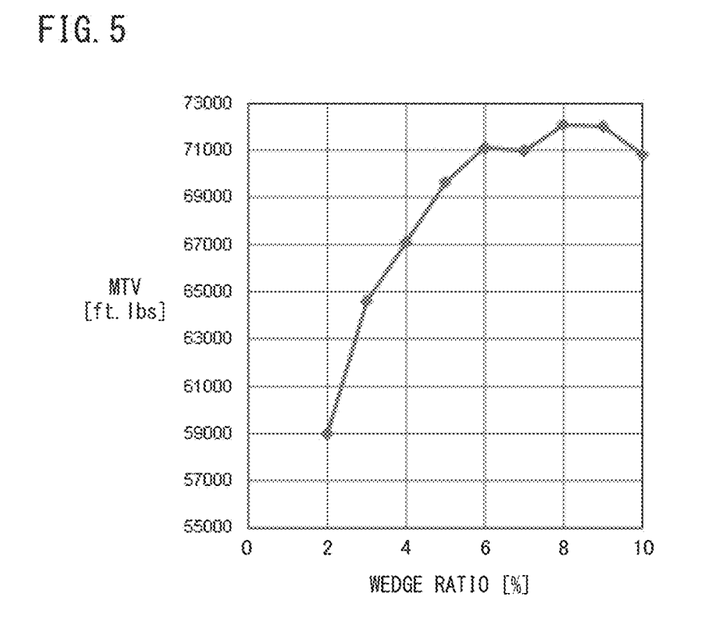
FIG. 5 is a graph illustrating the relationship between wedge ratio and yield torque for a loading-flank pitch of 7.2 mm.

FIGS. 3 to 5 illustrate values of yield torque obtained by the finite element analysis. In each of these graphs, the horizontal axis indicates wedge ratio and the vertical axis indicates MTV, where the MTV values corresponding to the wedge ratio values are plotted. Regardless of thread pitch, MTV increased as wedge ratio increased, and increased particularly rapidly in the range of 2 to 3%. As can be determined in FIGS. 3 and 5, MTV was at its maximum when wedge ratio was about 9%, and then decreased.

Torque performance increased presumably for the following reasons: if wedge ratio is high, the thread-crest width as measured near the tip of the pin 10 is small and, as a portion of the pin 10 with a small thread-crest width is tightened by a portion of the box 20 with a large thread-crest width, a high contact pressure is generated.

Figure 6:
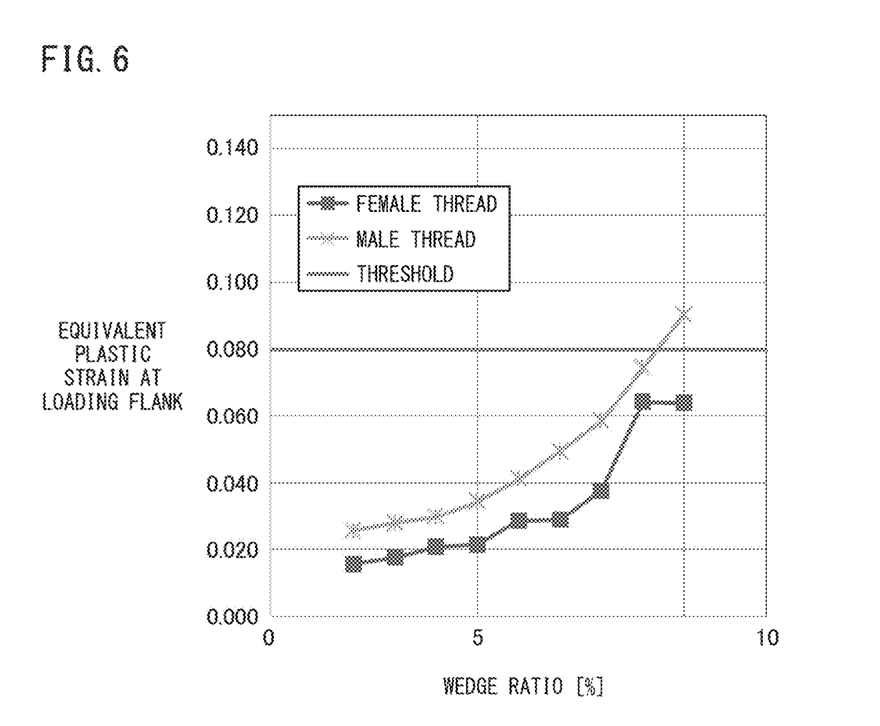
FIG. 6 is a graph illustrating the relationship between wedge ratio and equivalent plastic strain for a loading-flank pitch of 8.64 mm.
Figure 7:
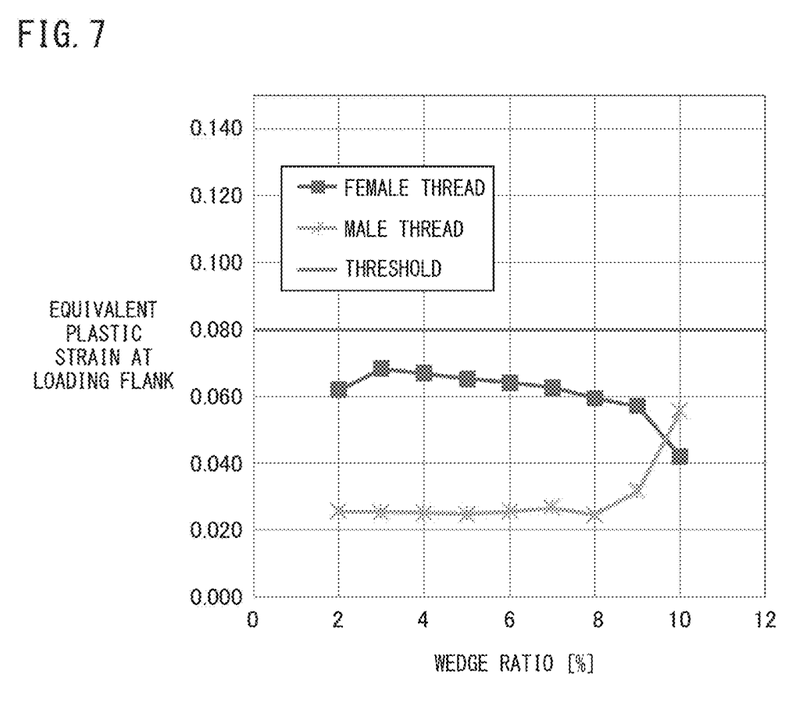
FIG. 7 is a graph illustrating the relationship between wedge ratio and equivalent plastic strain for a loading-flank pitch of 10.8 mm.
Figure 8:
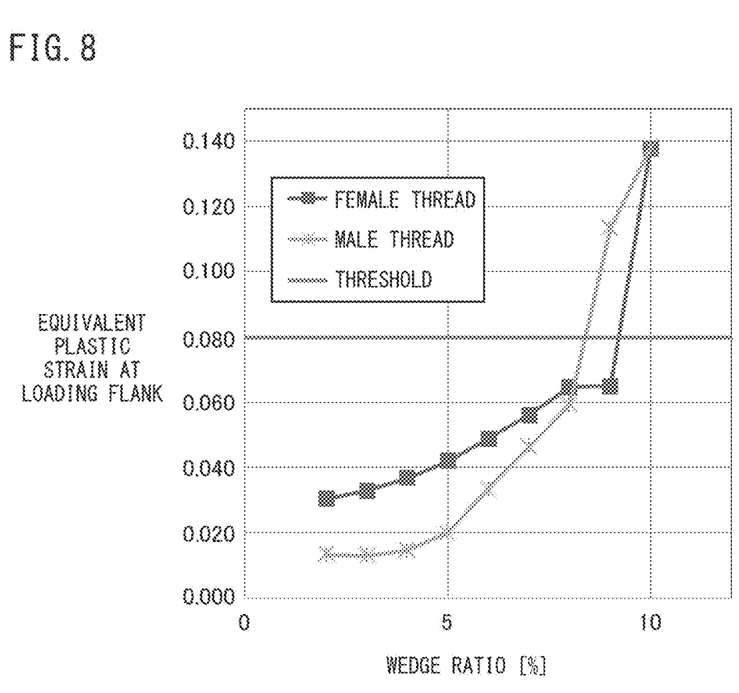
FIG. 8 is a graph illustrating the relationship between wedge ratio and equivalent plastic strain for a loading-flank pitch of 7.2 mm.

FIGS. 6 to 8 are graphs each illustrating the relationship between the maximum value of equivalent plastic strain generated when a tensile load was applied to a threaded connection 1 that had been made up as discussed above, and wedge ratio. This equivalent plastic strain was generated at the bases of the loading flanks 111 and 211 and stabbing flanks 112 and 212 of the thread located closest to the tip in each of the male and female threads 11 and 21.

As shown in FIG. 6, it was found that if the loading-flank pitch LP=8.64 mm, the maximum value of the equivalent plastic strain generated in the male thread exceeded 0.070 when wedge ratio was 9% or higher, and the maximum value of equivalent plastic strain exceeded 0.080 when wedge ratio reached 10%.

As shown in FIG. 7, if the loading-flank pitch LP=10.8 mm, equivalent plastic strain did not reach 0.070 even when wedge ratio was 10%. However, a tendency was recognized of the equivalent plastic strain generated in the male thread to rapidly increase as wedge ratio increased.

As shown in FIG. 8, it was found that if the loading-flank pitch LP=7.2 mm, the maximum value of the equivalent plastic strain generated in the male thread exceeded 0.080 when wedge ratio was 9% or higher; when wedge ratio was 10%, the strains in both the male and female threads exceeded 0.080 such that the threads were highly likely to be broken.

These results demonstrate that, to improve torque performance, the higher wedge ratio, the better. However, as discussed above, if wedge ratio is too high, the risk of a break of the thread near the tip of the pin (male thread) and/or box (female thread) increases; in view of this, wedge ratio is suitably not higher than 8%. Further, since a decrease in thread-crest width is equivalent to an increase in thread-root width and leads to increased pass number during thread machining and reduced life of the insert, an extremely high wedge ratio is not desirable from manufacturing viewpoints. In view of this, the appropriate wedge ratio was found to be 3 to 8%.

EXPLANATION OF CHARACTERS

1: threaded connection for steel pipe
10: pin
11: male thread
20: box

21: female thread
111, 211: loading flank
112, 212: stabbing flank
LP: loading-flank pitch
SP: stabbing-flank pitch

What is claimed is:

1. A threaded connection for a steel pipe, comprising:
a tubular pin formed by one tip portion of the steel pipe; and
a tubular box adapted to be made up on the pin as the pin is inserted into the box,
the pin including a male thread provided on an outer periphery of the pin, the male thread being a wedge thread,
the box including a female thread corresponding to the male thread and provided on an inner periphery of the box, the female thread being a wedge thread,
wherein the threaded connection satisfies the following expression, (1):

$$3\% \leq (LP-SP)/LP \leq 8\% \qquad (1),$$

where, in expression (1), LP is the pitch between loading flanks of the male thread, and SP is the pitch between stabbing flanks of the male thread.

2. The threaded connection for the steel pipe according to claim 1, wherein the threaded connection satisfies the following expression, (2):

$$4\% \leq (LP-SP)/LP \leq 7\% \qquad (2).$$

3. The threaded connection for the steel pipe according to claim 1, wherein the threaded connection satisfies the following expression, (3):

$$-10 \text{ degrees} \leq \alpha \leq -1 \text{ degree} \qquad (3),$$

where, in expression (3), α is the flank angle of the loading flank of the male thread, and β is the flank angle of the stabbing flank of the male thread.

4. The threaded connection for the steel pipe according to claim 1, wherein the male thread and the female thread each includes a perfect-thread portion including a perfect thread, and
the perfect-thread portion has a length of 40 to 60 mm as measured in an axial direction of the steel pipe.

* * * * *